United States Patent [19]

Cowden

[11] 4,041,252
[45] Aug. 9, 1977

[54] TRANSFORMERLESS TWO-WIRE/FOUR-WIRE HYBRID WITH DC SOURCING CAPABILITY

[75] Inventor: Earl Thomas Cowden, Galion, Ohio

[73] Assignee: North Electric Company, Galion, Ohio

[21] Appl. No.: 694,027

[22] Filed: June 7, 1976

[51] Int. Cl.² .............................................. H04B 1/58
[52] U.S. Cl. ............................................. 179/170 NC
[58] Field of Search ......... 179/170 R, 170 NC, 170 T

[56] References Cited

U.S. PATENT DOCUMENTS

| 3,855,430 | 12/1974 | Colardelle et al. | 179/170 NC |
|---|---|---|---|
| 3,886,322 | 5/1975 | Colardelle et al. | 179/170 NC |
| 3,970,805 | 7/1976 | Thomas | 179/170 NC |
| 3,973,089 | 8/1976 | Puckette | 179/170 NC |

Primary Examiner—Kathleen H. Claffy
Assistant Examiner—Randall P. Myers
Attorney, Agent, or Firm—Charles M. Hutchins

[57] ABSTRACT

An electronic hybrid circuit for coupling a two-wire communication path with a four-wire communication path is disclosed wherein the use of transformer coupling is eliminated. The hybrid features a novel arrangement whereby the unbalanced four-wire path incoming voice signal is amplified, then converted to a pair of balanced signal components by complementary signal injection devices coupled to opposite sides of the two-wire path. Each resultant balanced component is injected in series with a DC battery feed potential via current amplifiers in each signal injection means. Balanced two-wire path output signals are converted for transmission to the outgoing portion of the four-wire path by coupling the two-wire path to the series combination of a differential amplifier and an output buffer amplifier. A transhybrid balance network is connected between the output of one of the signal injection devices and the input of the buffer amplifier to prevent the coupling of signals from the incoming portion of the four-wire path from reaching the outgoing portion of four-wire path.

6 Claims, 1 Drawing Figure

TRANSFORMERLESS TWO-WIRE/FOUR-WIRE HYBRID WITH DC SOURCING CAPABILITY

BACKGROUND OF THE INVENTION

1. Field of the Invention

This invention is generally related to apparatus for effecting two-to-four wire conversion in communication systems. More particularly, the invention is directed to those arrangements utilizing electronic hybrid circuitry for interconnecting a two-wire subscriber loop to a four-wire transmission medium while simultaneously providing DC battery feed to said subscriber loop by means of the hybrid arrangement.

2. Description of the Prior Art

In communication systems, it is presently common practice to transmit signals between a subscriber station and the local switching office via a two-wire bidirectional communication path. However, it has sometimes become necessary, especially in the telephone toll network, to use a pair of one-way communication paths for further transmission of such communication signals originating from two-wire paths. Such a pair of one-way paths is commonly referred to as a four-wire communication path. Therefore, as is well-known in the telephony field, it has become necessary to provide a so-called hybrid arrangement to properly direct signal transmission between the two-wire bidirectional communication path and the input and output portions of the four-wire communication path, while preventing the coupling of four-wire input signals to the output portion of the four-wire path. Such preventative isolation is known in the art as the transhybrid balance function.

The classic approach to implementing the required hybrid functions involved the use of transformer coupling. However, the tranformer approach has inherent disadvantages including excessive physical size and weight, electromagnetic cross-coupling among adjacently located hybrid units, and deleterious effect on return and transhybrid loss caused by basic transformer electrical operating characteristics.

Prior art approaches utilizing electronic hybrid circuits have been proposed to overcome the inherent difficulties associated with transformer arrangements. However, even these prior electronic designs present problems of inefficient operation and lack of transhybrid balance adjustment capability as a function of two-wire path complex impedance variation. Additionally, the prior electronic approaches lack the capability for overcoming temporary longitudinal imbalance in the two-wire communication path.

With the recent introduction of digital switching technology to local switching systems, an increasing need has arisen for a hybrid arrangement at the interface of two-wire subscriber lines with the switching network. One type digital switching arrangement employing time division multiplexing of pulse-code-modulated digital voice signals requires an interface at the two-wire subscriber line for coupling to suitable coder/decoder apparatus — i.e., analog voice signals originating from the subscriber station set must be coupled to the digital encoder input, while analog signals from the decoder output must be coupled for transmission towards the station set and must simultaneously be prevented from reaching the encoder input.

The use of a subscriber line hybrid, as in the foregoing digital switching system example, presents an additional hybrid arrangement functional requirement not successfully addressed by the prior art, namely the provision at the hybrid of DC battery feed potential to the subscriber's two-wire communication path. Prior art approaches require the use of special battery feed devices at the two-wire path (e.g., inductive feed coils) to allow for efficient amplifier operation within the electronic hybrid. However, the use of such device one again introduces the adverse effects of increased size, weight, and noise coupling among adjacent hybrid circuits.

Hence, there is seen to be a need in the hybrid field for a truly inductorless, transformerless approach to implementing all of the classical hybrid functions in addition to meeting a further requirement for efficiently providing DC operating power to a two-wire subscriber line.

SUMMARY OF THE INVENTION

Therefore, in accordance with addressing deficiencies in prior art approaches, it is an object of this invention to provide a transformerless two-wire/four-wire hybrid arrangement capable of efficiently providing DC battery feed to the two-wire communication path connected to said hybrid while simultaneously performing the normal hybrid functions of signal routing and transhybrid balance.

An electronic hybrid arrangement is disclosed wherein the use of transformer coupling and/or battery feed coils has been eliminated. The input four-wire voice signal is coupled to a pair of combined battery and voice signal injection means by a air of input amplifiers. Each signal injection means includes a current amplifier with input coupled to an amplified four-wire input signal and configured in such a way that the injection means output is comprised of corresponding AC voice signal in superposition with a DC battery feed potential. The outputs of the two signal injection means are respectively coupled to opposite sides of the two-wire communication path thus presenting a balanced signal thereto. Additionally, each injection means includes a unidirectional current feedback element coupled from output to input of the injection means current amplifier operative to prevent large longitudinal two-wire path noise components from interfering with the normal operation of the injection means. Balanced two-wire path output signals are converted for appropriate transmission to the outgoing portion of the four-wire path by respectively coupling opposite sides of the two-wire path to the inputs of a differential amplifier. In turn, the output of said differential amplifier is coupled to an input of an output buffer amplifier whose output is coupled to the outgoing portion of the four-wire communication path. A transhybrid balance network is connected between the output of one of the signal injection means and the same input of the buffer amplifier which is coupled to the differential amplifier output. Impedance elements of the transhybrid balance network are suitably chosen so as to inject a current into the buffer amplifier input of such magnitude and polarity as to cancel the output of the differential amplifier to the extent that said output reflects the effect of signals presented to the hybrid over the incoming portion of the four-wire communication path.

According to one feature of this invention, the isolation of four-wire input signals from the four-wire output path (i.e., the transhybrid balance function) is solely a function of the characteristics of the transhybrid balance network.

A further feature of this invention is the capability of providing range extension features at the hybrid's combined battery and voice signal injection means.

BRIEF DESCRIPTION OF THE DRAWING

These and other objects and features of the invention will become apparent from a reading of the following detailed description of an illustrative embodiment taken in conjunction with the drawing in which.

DETAILED DESCRIPTION

Figure 1:
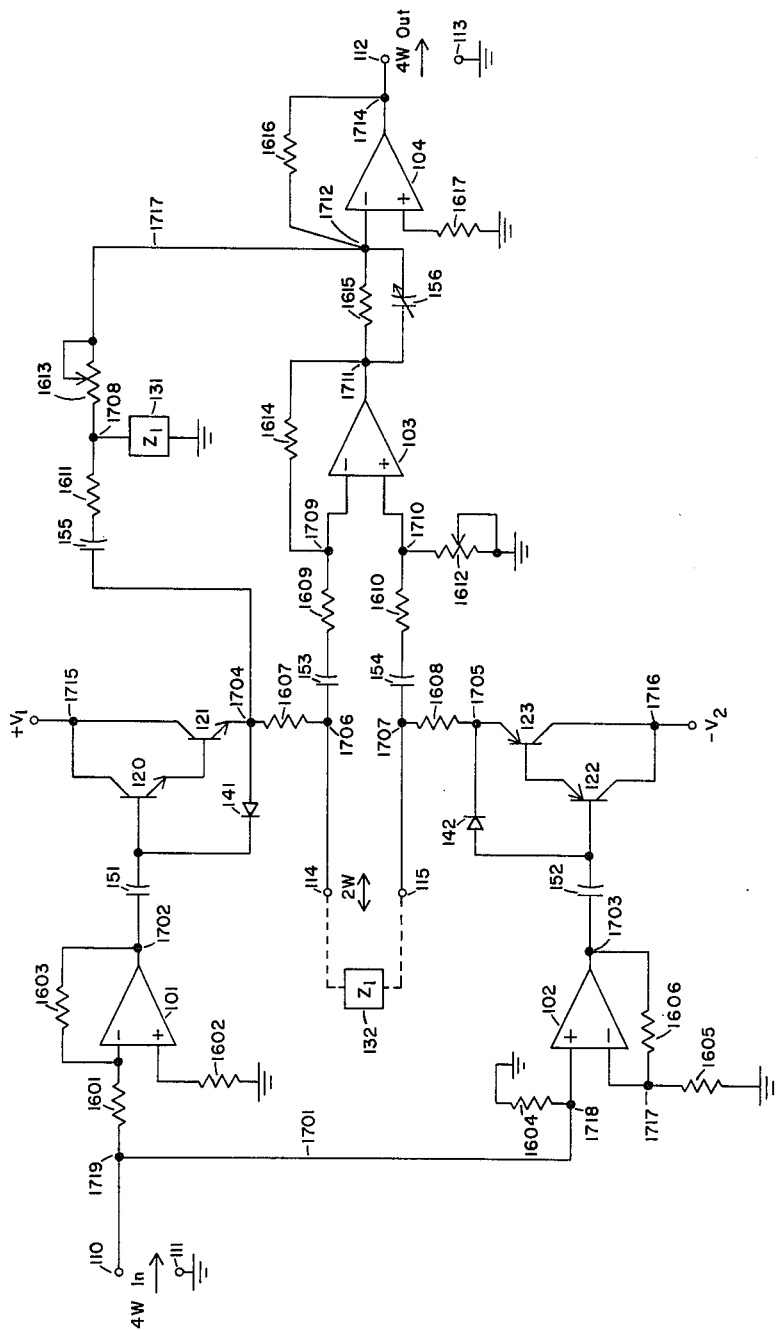
FIG. 1 is a schematic diagram of a transformerless hybrid arrangement constructed in accordance with the principles of the invention.

Referring to FIG. 1 the two-wire communication path is coupled to the hybrid arrangement at terminals 114 and 115. The dashed lines terminated by box 132 represent the fact that, looking out toward the two-wire subscriber path, one "sees" an AC impedance of $Z_1$.

The four-wire communication path is coupled to the hybrid arrangement at four-wire input path terminals 110 and 111 and at four-wire output path terminals 112 and 113. Unbalanced four-wire input signals are coupled, via node 1719 and resistor 1601, to the inverting input of input operational amplifier 101, and said input signals are further coupled from node 1719 via path 1701 to the non-inverting input of input operational amplifier 102.

The non-inverting input to amplifier 101 is connected to ground potential via resistor 1602. Resistor 1603 is connected as a feedback element from the output of amplifier 101, at node 1702, to the inverting input of amplifier 101.

The non-inverting input of amplifier 102 is additionally coupled to ground potential via node 1718 and resistor 1604. A feedback path for amplifier 102 runs from the output of amplifier 102 at node 1703 via resistor 1606 to the inverting input of amplifier 102. Additionally, the inverting input to amplifier 102 is connected to ground potential via node 1717 and resistor 1605.

The output of amplifier 101 is coupled via capacitor 151 to the input of first combined battery and voice signal injection means comprised of NPN transistors 120 and 121, DC potential source $+V_1$, and diode 141. Transistors 120 and 121 are interconnected in the well-known Darlington configuration with the emitter of transistor 120 connected to the base of transistor 121 and with the collectors of both transistor 120 and 121 connected via node 1715 to DC potential $+V_1$. Longitudinal balance diode 141 has its anode connected to the emitter of transistor 121 at node 1704 and its cathode connected to the junction point comprised of one side of capacitor 151 and the base of transistor 120.

In a similar fashion, the output of amplifier 102 is coupled via capacitor 152 to the input of second combined battery and voice signal injection means comprised of PNP transistors 122 and 123, DC potential source $-V_2$, and diode 142. Transistors 122 and 123 are connected in a Darlington configuration with the emitter of transistor 122 connected to the base of transistor 123 and with the collectors of both transistors 122 and 123 connected via node 1716 to DC potential source $-V_2$. Longitudinal balance diode 142 has its cathode connected to the emitter of transistor 123 at node 1705 and its anode connected to the junction point comprised of one side of capacitor 152 and the base of transistor 122.

The output of the first combined battery and voice signal injection means at node 1704 is coupled via resistor 1607 to one side of the two-wire communication path at node 1706. The output of the second combined battery and voice signal injection means at node 1705 is coupled via resistor 1608 to the opposite side of the two-wire path at node 1707.

The two-wire communication path also has one side coupled, via the series combination of capacitor 153 and resistor 1609, to the inverting input of differential amplifier 103, while the opposite side of the two-wire path is coupled, via the series combination of capacitor 154 and resistor 1610, to the non-inverting input of differential amplifier 103. Variable resistor 1612 is connected between ground potential and the non-inverting input to amplifier 103 at node 1710. Resistor 1614 comprises a feedback path between the output of amplifier 103 at node 1711 and the inverting input of amplifier 103 at node 1709.

The output of amplifier 103, at node 1711, is coupled to the inverting input of output buffer operational amplifier 104 at node 1712 via the parallel combination of resistor 1615 and variable capacitor 156. The non-inverting input to amplifier 104 is connected to ground potential via resistor 1617. Resistor 1616 comprises a feedback path from the output of buffer amplifier 104, at node 1714, to the inverting input of amplifier 104 at node 1712. The output of amplifier 104 is also connected to terminal 112 of the output portion of the four-wire communication path.

A transhybrid balance network is connected between the output of the first combined battery and voice signal injection means, at node 1704, and the inverting input of output buffer amplifier 104 at node 1712. The transhybrid balance network is comprised of the serial connection of capacitor 155, resistor 1611, and variable resistor 1613, along with impedance $Z_1$, shown schematically as box 131, coupled between ground potential and node 1708.

All operational amplifiers (101, 102, 103, and 104) of FIG. 1 are well-known in the electrical art and could, for example, be specified as type 741, commercially available from National Semiconductor Corp.

A description of the operation of the illustration embodiment shown in FIG. 1 follows. Unbalanced input voice signals are presented to the active hybrid at terminals 110, 111. Let this input signal be represented as $V_{4in}$. With $V_{4in}$ appearing at node 1719, it will be apparent to those skilled in the art that a voltage $-K_1V_{4in}$ will then be present at node 1702, the output of amplifier 101, while a voltage $+K_2V_{4in}$ will be present at node 1703, the output of amplifier 102. $K_1$ and $K_2$ are constants related to the biasing resistors of their corresponding operational amplifiers. It can be shown, for example, that with resistor 1603 equal to twice the value of resistor 1601, $K_1 = 2$, and with resistor 1606 equal in value to resistor 1605, $K_2 = 2$. In any event, it is seen that with $K_1$ made equal to $K_2$, equal but oppositely poled voltages, corresponding to the 4-wire input signal $V_{4in}$, are applied to the inputs of first and second combined battery and voice signal injection means via capacitors 151 and 152, respectively.

The outputs of the first and second combined battery and voice signal injection means appear at nodes 1704 and 1705, respectively. As seen from FIG. 1, the injection means output at node 1704 will be an AC signal proportional to $-K_1V_{4in}$ superimposed upon a DC battery potential equal to $+V_1$ minus the collector-to-emitter potential drop of NPN transistor 121. Similarly, the injection means output at node 1705 will be an AC signal proportional to $+K_2V_{4in}$ superimposed upon a DC battery potential equal to $-V_2$ plus the collector-to-emitter potential drop of PNP transistor 123. Feed resistors 1607 and 1608 would normally be chosen to each have a resistance value equal to one-half the DC impedance seen looking out toward the two-wire line connected to terminals 114 and 115, thus minimizing impedance mismatch signal reflection over the two-wire customer loop. The resultant signal presented to the two-wire line at nodes 1706 and 1707 thus comprises a balanced AC voice signal (assuming $K_1$ is made equal to $K_2$) in combination with DC battery feed to the two-wire line.

The effects of the above-discussed balanced AC voice signal are prevented from reaching the four-wire output path through use of the transhybrid balance network connected between nodes 1704 and 1712. As seen from FIG. 1, the AC portion of the signal at node 1704 is passed both to the two-wire line via feed resistor 1607 and to the transhybrid balance network via capacitor 155. By selecting the AC impedance, represented by box 131, to be equal to the AC impedance $Z_1$ presented at terminals 114 and 115 of the two-wire subscriber line, a cancellation signal is presented to node 1712 from the transhybrid balance network. This cancellation signal can be shown to be equal in magnitude but opposite in sign from any signal, appearing at the output of differential amplifier 103, that is caused by the balanced AC signal presented to the two-wire line from the outputs of the first and second combined battery and voice signal injection means. Since $Z_1$ can be provided quite accurately for the nominal two-wire line, cancellation is seen to be a function of the balance network only and not of the hybrid itself. Additional "fine tuning" of the transhybrid balance function is obtained via adjustable resistor 1613. Improved transhybrid balance at higher frequencies is obtained via adjustment of variable capacitor 156.

Balanced voice signals originated at the subscriber station set are presented to the hybrid arrangement at terminals 114 and 115. Such two-wire input signals are then respectively coupled to the inverting and non-inverting inputs of differential amplifier 103 via capacitor 153 and resistor 1609 and via capacitor 154 and resistor 1610. As seen further from FIG. 1, the resultant output of amplifier 103 is coupled to the output portion of the four-wire line at terminal 112 via output buffer operational amplifier 104. The transhybrid balance network, connected between nodes 1704 and 1712, is not involved with such two-wire input signals originated at the subscriber station set. This is due to the fact that for normal low level signals, the impedance at node 1704 is very low and appears as a virtual ground. The ground path appears through the collector emitter paths of transistors 120 and 121 through the AC ground of the battery supply $+V_1$, and also through the base-emitter junctions of transistors 120 and 121 to the virtual ground presented by the low output impedance of operational amplifier 101. This virtual ground path presents an impedance substantially smaller than that presented by the transhybrid balance network. Hence, essentially none of the signal at node 1704 due to the two-wire line input signal will flow through the transhybrid balance network connected between nodes 1704 and 1712.

A problem well-known in the telephony art involves longitudinal imbalance conditions. This problem is particularly acute for longer two-wire subscriber loops wherein the loop is exposed to inductive fields set up by adjacent 60 Hz. power lines. Since such stray signal pickup often involves a voltage of equal magnitude and polarity introduced to both sides of the two-wire line, this extraneous signal is often referred to as common mode noise. Common mode signal rejection is accomplished through use of differential amplifier 103 which is arranged to inhibit signals of equal magnitude and polarity appearing at the differential amplifier inputs. Common mode rejection for a particular subscriber line can be "fine tuned" on an individual two-wire line basis via adjustment of variable resistor 1612 of FIG. 1.

Further protection from common mode noise, or longitudinal line pickup, is achieved through use of diodes 141 and 142. In addition to serving as reverse breakdown protection devices for their respective Darlington transistor pairs, diodes 141 and 142 serve to divert longitudinal signal swings which otherwise would tend to disrupt the normal biasing condition at each Darlington amplifier of the first and second combined battery and voice signal injection means. For example, a large positive-going longitudinal noise component appearing at node 1704 would, in the absence of diode 141, tend to reverse bias the base-emitter junctions of NPN transistors 121 and 120. However, with the insertion of diode 141, such a signal is diverted to a low impedance ground at the output of operational amplifier 101. As seen from FIG. 1, a similar bypass effect is provided for negative-going longitudinal noise signals by diode 142.

The arrangement shown in FIG. 1 obviously lends itself to battery-boost, or range extension, applications merely by increasing the total DC battery potential applied via sources $+V_1$ and $-V_2$, while providing sufficient margin for the voltage swing across transistor 121 and 123, representing the AC voice signal being superimposed on the DC battery feed.

It should be noted that the invention described herein has been illustrated with reference to a particular embodiment. It is to be understood that many details used to facilitate the description of such a particular embodiment are chosen for convenience only and without limitation on the scope of the invention. Many other embodiments may be devised by those skilled in the art without departing from the scope and spirit of the invention. Accordingly, the invention is intended to be limited only by the scope and spirit of the appended claims.

What is claimed is:

1. A transformerless hybrid arrangement for coupling a two-wire communication path having first and second terminals to a four-wire communication path having an input terminal pair and an output terminal pair and for simultaneously providing said two-wire communication path with DC battery feed, said arrangement comprising;

first and second combined battery and voice signal injection means for furnishing AC voice signals in series with DC battery potential at respective combined injection means outputs, first and second input amplifiers respectively coupling a four-wire input signal at said input terminal pair to the inputs of said first and second combined battery and voice signal injection means, first and second coupling means for respectively coupling the outputs of said first and second injection means to said first and second terminals of said two-wire communication path, a differential amplifier having inputs respectively coupled to said first and second terminals of said two-wire communication path, a buffer amplifier having one input coupled to the output of said differential amplifier and an output coupled to said output terminal pair of said four-wire communication path, and transhybrid balance means having an input arranged for receipt of a signal proportional to said four-wire input signal and having an output coupled to said one input of said buffer amplifier.

2. A transformerless hybrid arrangement as set forth in claim 1, wherein each of said first and second combined battery and voice signal injection means comprises;

an associated reference source of DC power, amplification means operative, in response to AC signals received at the input of the injection means and to DC bias signals supplied from said associated reference source, to furnish, at the output of the injection means, AC output signals proportional to said AC signals received at the input of the injection means in superposition with a DC battery feed potential having magnitude proportional to the magnitude of the potential of said associated reference source.

3. A transformerless hybrid arrangement as set forth in claim 1, wherein said transhybrid balance means comprises;

a series combination of a capacitance means, and first and second resistance means, said series combination connected between the input and output of said transhybrid balance means, an intermediate terminal between said first and second resistance means, complex impedance means coupled between said intermediate terminal and a reference potential, said complex impedance means presenting an impedance substantially equivalent to the complex impedance presented by said two-wire communication path at said first and second terminals thereof, said transhybrid balance means being operative in response to a signal at its input to produce a corresponding cancellation signal at its output, thereby isolating the effects of said four-wire input signal from the output of said buffer amplifier.

4. A transformerless hybrid arrangement as set forth in claim 1, wherien said first combined battery and voice signal injection means comprises;

a first reference source of DC power, first and second NPN transistors, the base electrode of said first NPN transistor coupled to the input of said first injection means for receipt of output signals from said first buffer amplifier, the collector electrodes of both first and second NPN transistors coupled to said first reference source, the emitter electrode of said first NPN transistor coupled to the base electrode of said second NPN transistor, and the emitter electrode of said second NPN transistor coupled to the output of said first injection means.

whereby said output of said first injection means furnishes a first signal proportional to said four-wire input signal, said first signal being in superposition with a first DC potential having magnitude proportional to the magnitude of the potential of said first reference source.

5. A transformerless hybrid arrangement as set forth in claim 4, wherein said second combined battery and voice signal injection means comprises;

a second reference source of DC power, first and second PNP transistors, the base electrode of said first PNP transistor coupled to the input of said second injection means for receipt of output signals from said second input amplifier, the collector electrodes of both first and second PNP transistors coupled to said second reference source, the emitter electrode of said first PNP transistor coupled to the base electrode of said second PNP transistor, and the meitter electrode of said second PNP transistor coupled to the output of said second injection means, whereby said output of said second injection means furnishes a second signal substantially equal in magnitude to, but opposite in sign from, said first signal furnished at the output of said first injection means, said second signal being in superposition with a second DC potential having magnitude proportional to the magnitude of the potential of said second reference source.

6. A transformerless hybrid arrangement as set forth in claim 5, further comprising;

a first diode having an anode electrode connected to the output of said first injection means and having a cathode electrode connected to the input of said first injection means, and a second diode having a cathode electrode connected to the output of said second injection means and having an anode electrode connected to the input of said second injection means, whereby longitudinal noise signals appearing on said two-wire communication path are diverted from the outputs of said first and second injection means.

* * * * *